United States Patent
Gurijala et al.

(10) Patent No.: US 6,601,090 B1
(45) Date of Patent: Jul. 29, 2003

(54) SYSTEM AND METHOD FOR SERVICING INTERNET OBJECT ACCESSESS FROM A COUPLED INTRANET

(75) Inventors: Anil Gurijala, Dallas, TX (US); Basudeb Dash, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/344,788

(22) Filed: Jun. 25, 1999

(51) Int. Cl.[7] .................................................. G06F 7/00
(52) U.S. Cl. ..................... 709/213; 709/216; 709/218; 709/203
(58) Field of Search ................................ 709/203, 201, 709/213; 707/10; 717/10

(56) References Cited

U.S. PATENT DOCUMENTS

| | | | | |
|---|---|---|---|---|
| 5,878,218 A | * | 3/1999 | Maddalozzo, Jr. et al. | 707/10 |
| 5,944,780 A | * | 8/1999 | Chase et al. | 709/201 |
| 6,026,474 A | * | 2/2000 | Carter et al. | 707/10 |
| 6,128,701 A | * | 10/2000 | Malcolm et al. | 711/133 |
| 6,185,608 B1 | * | 2/2001 | Hon et al. | 707/10 |
| 6,192,398 B1 | * | 2/2001 | Hunt | 707/10 |
| 6,219,676 B1 | * | 4/2001 | Reiner | 707/201 |
| 6,253,234 B1 | * | 6/2001 | Hunt et al. | 707/10 |
| 6,275,470 B1 | | 8/2001 | Ricciulli | 370/238 |
| 6,405,219 B2 | | 6/2002 | Saether et al. | 707/201 |

(List continued on next page.)

OTHER PUBLICATIONS

Peter B. Danzig, Richard S. Hall, Michael F. Scwartz, A Case for Caching File Objects Inside Internetworks, Technical Report Cu–CS–642–93, Mar. 1993, Department of Computer Science, University of Colorado, Boulder, Colorado 80309–430; Computer and Communications Reviews, 23(4):239–248, Oct. 1993.

D. Wessels, K. Claffy, Internet Cache Protocl (ICP), version 2, Network Working Group, Request for Comments: 2187, Informational, Sep. 1997.

(List continued on next page.)

*Primary Examiner*—Ayaz Sheikh
*Assistant Examiner*—Syed A. Zia
(74) *Attorney, Agent, or Firm*—Withrow & Terranova, PLLC (57) ABSTRACT

An object caching system (100) serving an Intranet (102) includes a cache name server (106) and a plurality of web cache servers (108A–108D). Each of the plurality of web cache servers (108A–108D) couples to an Intranet (104) and to the Internet (102) and stores a respective plurality of Internet objects that have been previously retrieved from the Internet (102). The cache name server (106) couples to the Intranet (104), receives a request for an Internet object from a web client (110A) coupled to the Intranet (104), and directs the web client (110A) to a serving web cache server (108A) of the plurality of web cache servers (108A–108D) based upon the request. If the serving web cache server (108A) possesses a copy of the Internet object, it returns a copy of the Internet object to the web client (110A). However, if the serving web cache (108A) server does not possess a copy of the Internet object, it retrieves a copy of the Internet object from the Internet (102) and returns a copy of the Internet object to the web client (110A). The cache name server (106) includes a database that stores an identifier and a serving web cache server ID for each Internet object stored by the plurality of web cache servers (108A–108D). The cache name server database may also store a time stamp for each Internet object. Each web cache server (108A–108D) also includes a database that stores Internet objects and respective time stamps.

19 Claims, 7 Drawing Sheets

U.S. PATENT DOCUMENTS

| | | |
|---|---|---|
| 6,421,726 B1 | 7/2002 | Kenner et al. ............... 709/225 |
| 6,457,047 B1 | 9/2002 | Chandra et al. ............ 709/217 |
| 6,463,508 B1 | 10/2002 | Wolf et al. .................. 711/133 |
| 2002/0143798 A1 | 10/2002 | Lisiecki et al. ............. 707/200 |
| 2002/0143888 A1 | 10/2002 | Lisiecki et al. ............. 709/214 |
| 2002/0147774 A1 | 10/2002 | Lisiecki et al. ............. 709/203 |

OTHER PUBLICATIONS

James Gwertzman and Margo Seltzer. World–Wide Web Cache Consistency. In Proceedings of the USENIX Technical Conference, San Diego, CA, Jan. 1996.

V. Holmedahl, B. Smith and T. Yang. Cooperative Caching of Dynamic Content on a Distributed Web Server. In Proceedings of the 7th IEEE International Symposium on High Performance Distributed Computing (HPDC–7), pp. 243–250, Chicago, IL, Jul. 1998.

Venkata N. Padmanabhan, Jeffrey C. Mogul, Using Predictive Prefetching to Improve World Wide Web Latency, 16. Computer Communication Review, 26(3):22–36, Jul. 1996.

Virgilio Almeida, Azer Bestavros, Mark Crovella, Adrina De Oliveira, Characterizing Reference Locality in the WWW. In Proceedings of the IEEE–ACM Conference on Parallel and Distributed Information Systems (PDIS'96), Miami Beach, FL, Dec. 1996.

Jussara Almeide and Pei Cao. Measuring Proxy Performance with the Wisconsin Proxy Benchmark. In Third International WWW Caching Workshop, Manchester, England, Jun. 1998.

Ghaleb Abdulla, A. H. Nayfeh and Edward A. Fox. A Realistic Model of Request Arrival Rate to Caching Proxies. Submitted for publication., 1997.

Marc Abrams, Charles R. Standridge, Ghaleb Abdulla, Stephen Williams, and Edward Foxx. Caching proxies: Limitations and potentials. In Proceedings of the Fourth International World Wide Web Conference, pp. 119–133, Boston, MA, Dec. 1995.

Lee Breslau, Pei Cao, Li Fan, Graham Phillips, and Scott Shenker. Web Caching and Zipf–like Distributions: Evidence and Implications. In Proceedings of INFOCOM'99, 1999.

Eric A. Brewer, Paul Gauthier, and Dennis McEvoy . . . The long–term viability of large–scale caching. In Third International WWW Caching Workshop, Manchester, England, Jun. 1998.

D. Wessels, K. Claffy, Internet Cache Protocl (ICP), version 2, Network Working Group, Request for Comments: 2186, Informational, Sep. 1997.

Ramon Caceres, Fred Douglis, Anja Feldmann, Gideon Glass, and Michael Rabinovich. Web proxy caching: the devil is in the details. In Workshop on Internet Server Performance (WISP'98), Madison, WI, Jun. 1998.

Pei Cao and Sandy Irani. Cost–Aware WWW Proxy Caching Algorithms. In Proceedings of the USENIX Sympsium on Internet Technology and Systems, pp. 193–206, Dec. 1997.

Andrew Cormack. Web caching. Available from http://www.jisc.ac.uk/acn/caching.html, 1996.

Brian D. Davison. A Survey of Proxy Cache Evaluation Techniques. In Fourth International WWW Caching Workshop (WCW99), San Diego, CA, Mar. 1999.

* cited by examiner

SYSTEM AND METHOD FOR SERVICING INTERNET OBJECT ACCESSESS FROM A COUPLED INTRANET

BACKGROUND

1. Technical Field

The present invention relates generally to accessing objects available across the Internet; and more particularly to a system and method for caching such objects within an Intranet that couples to the Internet.

2. Related Art

The construction and operation of the publicly available Internet is generally known. Further, the construction and operation of Intranets that service a plurality of web clients are also generally known. As contrasted to the Internet which is available to the general public, Intranets service only a plurality of designated Intranet web clients and are typically established by businesses, universities or other entities. The Intranets service communications within the entities for the exchange of data, programs, work products, news and other information among the designated Intranet web clients.

With the great popularity and availability of the Internet, Intranet web clients require access to Internet resources as well. However, Intranets must be maintained and managed so that may support their primary intended communication purposes. Connections to the Internet jeopardize the integrity of the Intranets that may be caused by unauthorized entry, the introduction of viruses from the Internet and other attacks that come from the Internet. One methodology for protecting the Intranets is to limit access to the Intranets using Firewalls, which attempt to preclude unauthorized entry. Further, in the operation of most Intranets, Internet access by Intranet web clients is monitored in a further attempt to prevent problems. To perform this monitoring, Internet accesses are generally serviced via a proxy server or other interface between the Internet and Intranet.

Internet accesses require usage of external data links, the owners of such data links charging for the Internet accesses. In order to recapture the costs associated with these operations, administrators of the Intranets attempt to modify web client behavior to reduce the number of Internet accesses. However, establishing policies to reduce Internet accesses by the web clients typically fail. Web clients (on the Intranet) require the valuable resources available on the Internet and are not easily dissuaded.

Thus, in order to limit the volume of Internet accesses from the Intranet, some Intranets include Web Cache Servers (WCSs) which are implemented in conjunction with network proxies that reside between the Intranet and the Internet. Each web proxy services an associated set of web clients. When a web client requests that the object be accessed, the web client sends a request to the WCS, the WCS accesses the object, stores a copy of the object internally and sends a copy to the web client. On subsequent accesses of the object by any of an associated set of web clients, the cached object is returned to the web client and no Internet access is required.

By providing the WCS at the network proxy, the volume of external accesses (to the Internet) decreases and assessed costs also decrease. Further a reduction in external accesses decreases security risks, decreases load on the Internet, decreases load on the external web servers (coupled to the Internet that store the object), improves response times to the web clients and reduces the load on the Intranet Firewall.

Unfortunately, each network proxy can only service a limited number of web clients. Thus, each Intranet requires multiple network proxies, each network proxy associated with a relatively small set of web clients. Further, since web clients on an Intranet generally access the same objects, each WCS may cache the same objects as are cached in other WCSs. In such case, the burden of installing and servicing the WCSs may exceed any benefit obtained through their operation.

Thus, there is a need in the art for a system that reduces Internet object accesses from an Intranet such that redundancies are minimized, resources are efficiently used and the benefits provided by such a system outweigh any burdens created therefrom.

SUMMARY OF THE INVENTION

Thus, to overcome the shortcomings of the prior systems, among other shortcomings, an object caching system serving an Intranet constructed according to the present invention includes a cache name server and a plurality of web cache servers. Each of the plurality of web cache servers couples to the Intranet and to the Internet and stores a respective plurality of Internet objects that have been previously retrieved from the Internet. The cache name server couples to the Intranet, receives a request for an Internet object from a web client coupled to the Intranet, and directs the web client to a serving web cache server of the plurality of web cache servers based upon the request. If the serving web cache server possesses a copy of the Internet object, it returns a copy of the Internet object to the web client. However, if the serving web cache server does not possess a copy of the Internet object, it retrieves a copy of the Internet object from the Internet and returns a copy of the Internet object to the web client.

Dynamically binding web clients to web cache servers based upon the Internet object being requested provides many important advantages. No longer is each web client bound to a particular web cache server. Thus, loading may be distributed among the web cache servers. Further, multiple copies of Internet objects need not be cached by the web cache servers. Thus, the system of the present invention is more efficient and dynamic than the prior systems.

The cache name server includes a database that stores an identifier for each Internet object stored by the plurality of web cache servers. The cache name server also stores the identity of a serving web cache server for each Internet object stored by the plurality of web cache servers. The cache name server database may also store a time stamp for each Internet object.

Each web cache server also includes a database that stores a copy of each Internet object stored by the respective web cache server. Each web cache server may also store in its database a time stamp for each Internet object stored by the respective web cache server.

In Internet object parsing operations, the web cache server may remove a reference to an Internet object stored by a web cache server and direct the web cache server to remove the Internet object. Each web cache server may also perform such parsing operation, removing a stored Internet object and directing the cache name server to remove its reference to the Internet object. In these parsing operations, performed either by the cache name server or by the web cache servers, the Internet objects are removed based upon at least one deletion criterion. The deletion criterion may be the frequency at which web clients request the Internet object such that infrequently requested Internet objects are parsed.

According to another deletion criterion, the Internet objects are deleted based upon their age.

When Internet objects are frequently requested, multiple copies of an Internet object may be cached in the web cache servers. By making multiple copies, loading on each web cache server corresponding to the object will be reduced.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
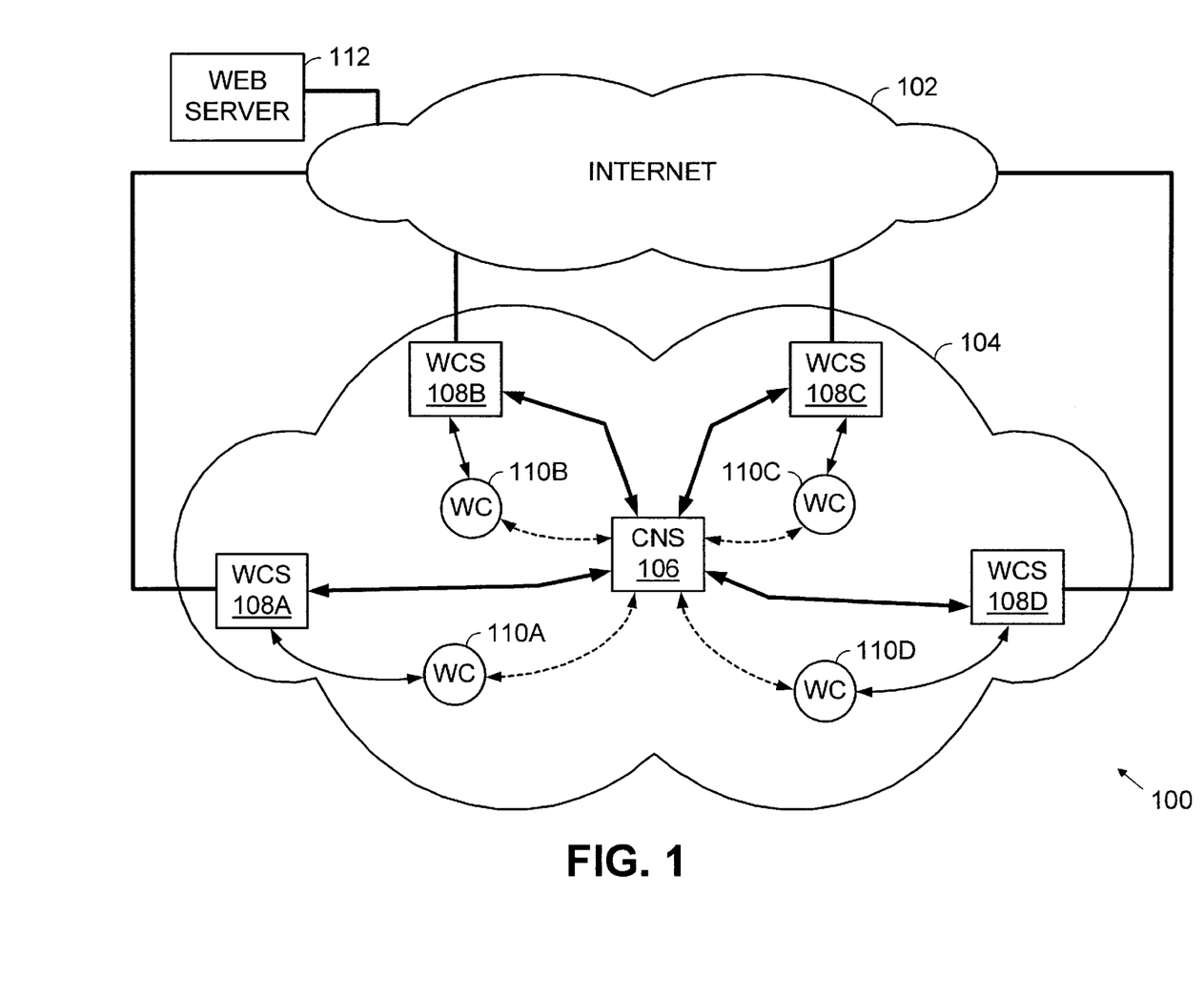
FIG. 1 is a system diagram illustrating an Intranet caching system constructed according to the present invention installed as part of an internet and that intercouples with the Internet.

FIG. 1 is a system diagram illustrating an Intranet caching system constructed according to the present invention installed as part of an internet and that intercouples with the Internet. The Intranet caching system resides within, and forms a portion of an Intranet 104 that services an enterprise or other organization. The organization may be a corporation, university, or simply a group of computer users that require communications support. The Intranet 104 is maintained as a substantially separate entity from the Internet 102 but couples to the Internet 102 at unique points for the purposes of information exchange. The structure and operation of the Internet 102 is generally known and will not be described herein except as to expand upon the teachings and concepts of the present invention.

The Intranet 104 includes networking components such as switches, hubs and routers which are interconnected by wired or wireless links. The Intranet 104 provides communication services for web clients (WCs) 110A, 110B, 110C and 110D which are computers or other electronic devices. Thus, each of the WCs 110A–110D includes a network interface, e.g., network interface card, that interfaces the WC to the Intranet 104. The communication services supported allow the WCs 110A–110D to communicate with one other and to communicate with devices coupled to the Internet 102.

In a common operating scenario, a WC, e.g., WC 110D communicates with a web server 112 to download objects from the web server 112. These objects may include web pages (e.g., HTML files), audio files, video files, executable files, cookies and other content. As is known, these objects are uniquely identified within the Internet 102 so that they may be accessed via a single address. Such an address typically includes an IP address and may also include a directory path and a file name. The object may also be addressed using a uniform resource identifier (URI) instead of an IP address.

Operation of the Intranet 104 is consistent with a networking standard such as the Internet Protocol/Transfer Control Protocol (TCP/IP), the Asynchronous Transfer Mode (ATM), Netware, NetBIOS, Windows Networking or another networking standard. For the purposes of the present invention, operation may proceed according to any networking standard currently available networking standard or networking standard that may become available.

According to the present invention, the Intranet 104 includes a Cache Name Server (CNS) 106 and a plurality of Web Cache Servers (WCSs) 108A, 108B, 108C and 108D. As is shown, each of the WCSs 108A, 108B, 108C and 108D couples to the Internet 102. Thus, the WCSs 108A, 108B, 108C and 108D may also perform firewall functions and network proxy functions as well as the caching functions described herein. The WCSs 108A–108D are digital computers that have Intranet 104 interfaces as well as Internet 102 interfaces. The structure of the WCSs 108A–108D (as well as the CNS 106) will be described further with reference to FIG. 7.

According to the present invention, WCs 110A, 110B, 110C and 110D are not statically bound to any particular WCS 108A–108D. However, during an object access by a WC 110A, 110B, 110C or 110D, the WC is dynamically bound to a particular WCS for the duration of the object access. During the object access, the CNS 106 dynamically binds a requesting WC to a particular WCS 108A, 108B, 108C or 108D. The dynamic binding may be made based upon the identity of the object being requested or upon the loading on each of the WCSs 108A–108D depending upon the particular operation.

The CNS 106 is also a digital computer that maintains a database indicating which objects are stored on each of the WCSs 108A–108D. Object requests are first made to the CNS 106 by each of the WCs 110A, 110B, 110C and 110D. The CNS 106 receives an object request from a WC, e.g., 110C, and queries its database to determine if any of the WCSs 108A–108D store a copy of the requested object. If so, the CNS 106 directs the WC 110C to a WCS, e.g., 108C, that stores the copy of the object, the WC 110C queries the WCS 108C for the object and the WCS 108C returns a copy of the object to the WC 110. If not, the CNS 106 directs the WC 110C to a selected WCS 108D, the WC 110C queries the WCS 108D for the object and the WCS 108D queries a web server 112 which stores the object. The web server 112 then returns a copy of the object to the WCS 108D and the WCS 108D transmits a copy of the object to the WC 110C. Further, the WCS 108D caches a copy of the object locally and notifies the CNS 106 that it now has a copy of the object. The CNS 106 then indexes the cached object in its database to the WCS 108D so that WCS 108D will service subsequent accesses to the object. Thus, according to the present invention any of the WCs 110A–110D may be bound to any of the WCSs 108A–108D during a particular object access.

Figure 2:
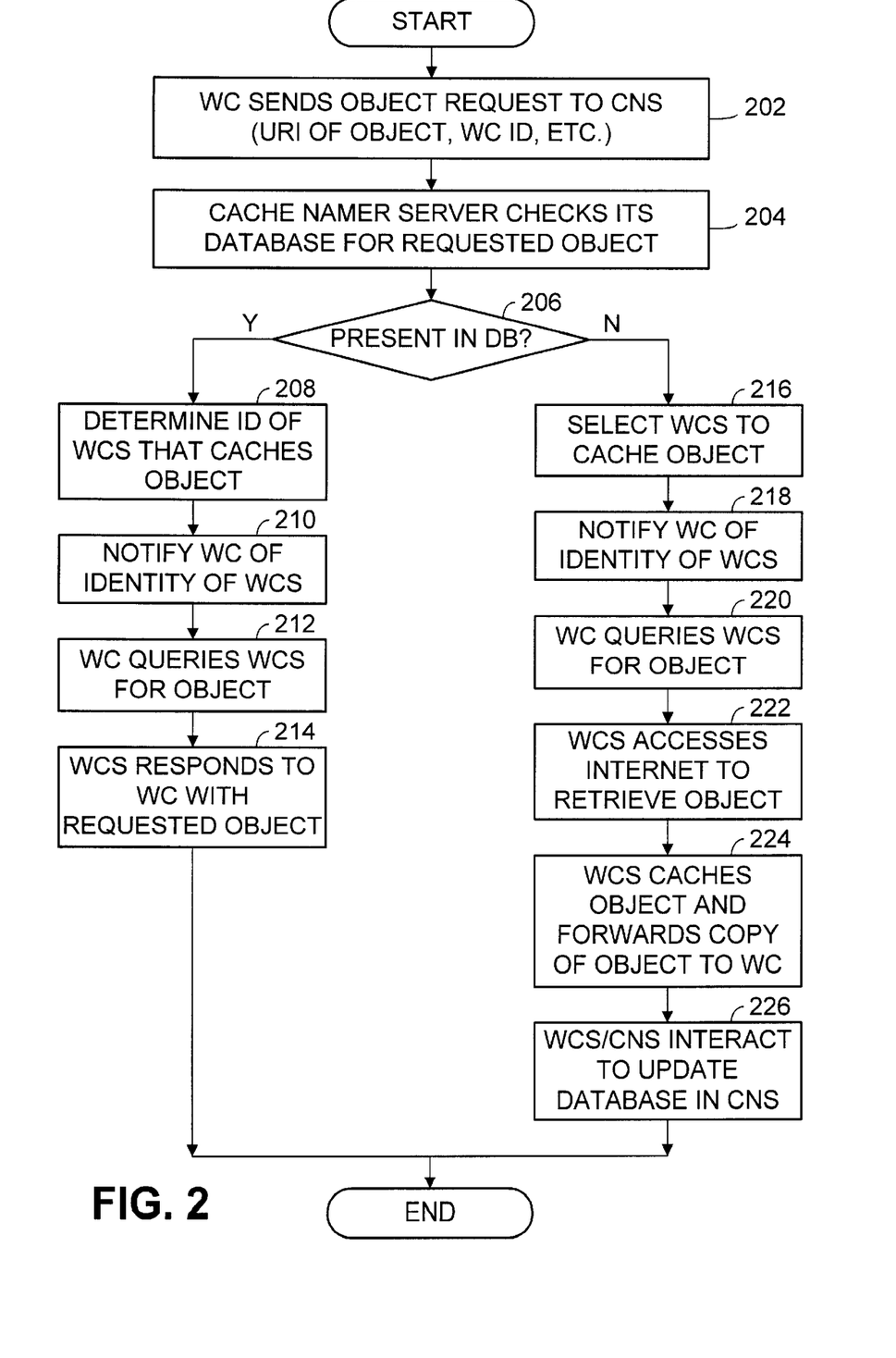
FIG. 2 is a logic diagram illustrating operation of the Intranet caching system of FIG. 1 during a web client object access.

FIG. 2 is a logic diagram illustrating operation of the Intranet caching structure of FIG. 1 during a web client object access. Operation commences when a WC sends an object request to its servicing CNS (step 202). The object request includes the URI (or IP address) of the requested object, the identity of the WC and may include additional information regarding the object request. The CNS then accesses its database, searching for the requested object (step 204) and determines whether the requested object is present in the database (step 206).

If the requested object is present in the database of the CNS, as determined at step 206, the WCS determines the identity of the WCS that currently stores a cached copy of the object (step 208). Once this information is determined, the CNS notifies the WC of the identity of the WCS that has a copy of the object cached (step 210). The WC then queries the WCS for the object (step 212) and the WCS responds to the WC's request with a copy of the requested object (214). From step 214, operation ends.

If at step 206 it was determined that the requested object is not indexed in the database of the CNS, the CNS selects a WCS of the available WCSs to service the object request (step 216). Such selection may be made based upon the loading level and capability of each of the available WCSs, a predetermined mapping between WCSs and objects, maintenance schedules for the WCSs or other criteria that may be used to load the WCSs. The CNS then notifies the WC of the identity of the selected WCS (step 218). Based upon the information received from the CNS, the WC then queries the WCS for the object (step 220).

Since the WCS does not have a copy of the requested object, it accesses the Internet to retrieve a copy of the requested object (step 222). The WCS then receives a copy of the requested object, caches a copy of the object and forwards a copy of the object to the requesting WC (step 224). Finally, the WCS and the CNS interact so that the database of the CNS is updated (step 226). In updating the database of the CNS, an entry is created for the object, a copy of which is now stored on the WCS. This entry includes the identity of the object (e.g., URI), the identity of the WCS that stores a copy of the object, the age of the copy of the stored object and may include additional information regarding the stored copy of the object. From step 226, operation ends.

Figure 3:
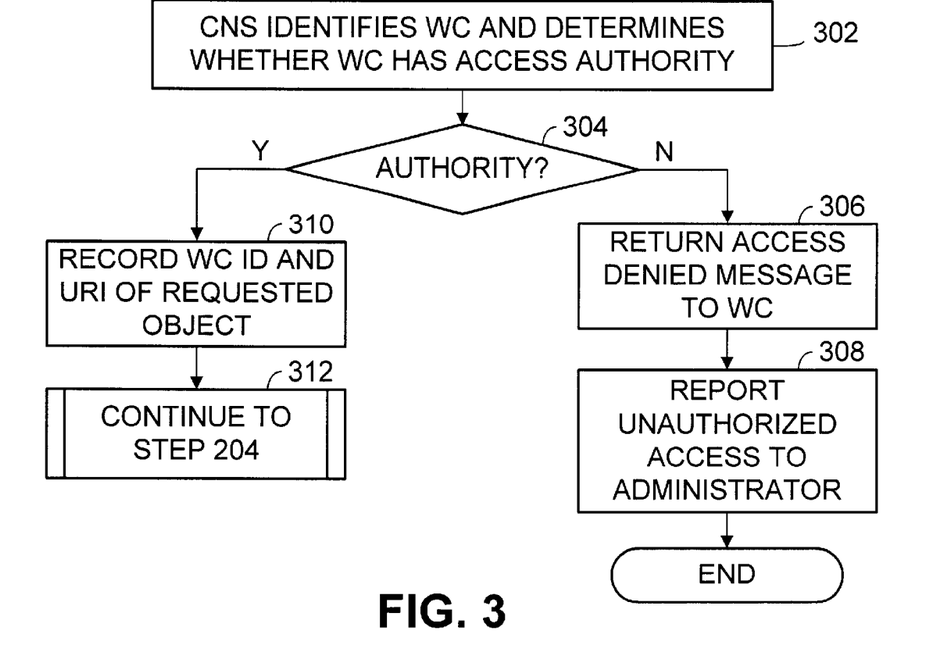
FIG. 3 is a logic diagram illustrating additional steps according to the present invention in which a cache name server validates a web client and operates accordingly based upon the validation.

FIG. 3 is a logic diagram illustrating additional steps according to the present invention in which a cache name server validates a web client and operates accordingly based upon the validation. Because access to the CNS is limited to a valid set of WCs, accesses to the resources of the CNS and the coupled WCSs must be verified based upon the identity of the requesting WC. Thus, the steps of FIG. 3 are be performed after step 202, but before step 204 of FIG. 2. Upon a CNS access, the CNS identifies the WC and determines whether the WC as access authority (step 302). If the WC does have access authority (as determined at step 304), the CNS makes a record of the identity of the WC and the URI (or other identifier) of the requested object (step 310). Once this information is recorded, operation proceeds to step 204 of FIG. 2 (step 312).

By recording this access information, the CNS may perform many useful functions. In one operation, the CNS may establish usage levels of each WC or group of WCs. These CNS and WCSs usage levels may be used in allocating charges to the WCs. This information may also be used to determine when more than one copy of an object should be cached and/or the object should be frequently updated. Because some objects are frequently requested (e.g., world news, company news, intra-company communications, etc.) servicing of these object requests may be distributed on more than one WCS. Further, if an object is frequently requested, it may indicate that the content of the object changes frequently over time (e.g., stock prices, commodity prices, sports information, etc.). In such case, the CNS should periodically remove the object entry so that new copies of the object will be frequently obtained from the object's source.

If at step 304 it is determined that the WC does not have access authority to the CNS, the CNS will return an access denied message to the WC (step 306). Further, the CNS reports the unauthorized access to a network administrator and identifies the WC (step 308). From step 308 operation ends.

Figure 4:
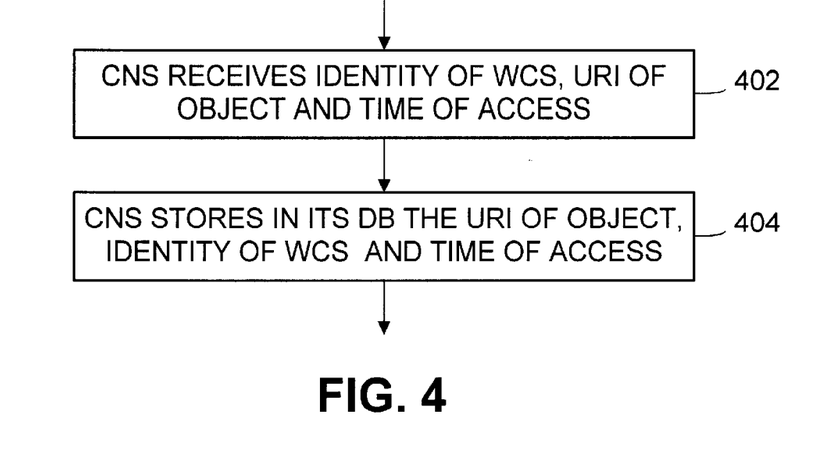
FIG. 4 is a logic diagram illustrating additional steps according to the present invention in which a web cache server interacts with a cache name server to update its contents based upon an internet access by the web cache server.

FIG. 4 is a logic diagram illustrating additional steps according to the present invention in which a web cache server interacts with a cache name server to update its contents based upon an internet access by the web cache server. These steps are performed in conjunction with the operation previously described with reference to step 226 of FIG. 2. After a WCS has downloaded an object from the internet and provided a copy of the object to a requesting WC, the WCS notifies the CNS of such events so that the CNS can update its database. The CNS receives the identity of the WCS, the URI (or other identifier) of the object and the time at which the WCS downloaded the object (step 402). In another embodiment of the operation, a date and time stamp for the object is downloaded with the object and provided to the CNS. Then, the CNS stores the URI of the object, the WCS identity and the time stamp or download time in its database (step 404). The CNS then performs other updates as may be required so that the record is searchable upon subsequent accesses.

Figure 5:
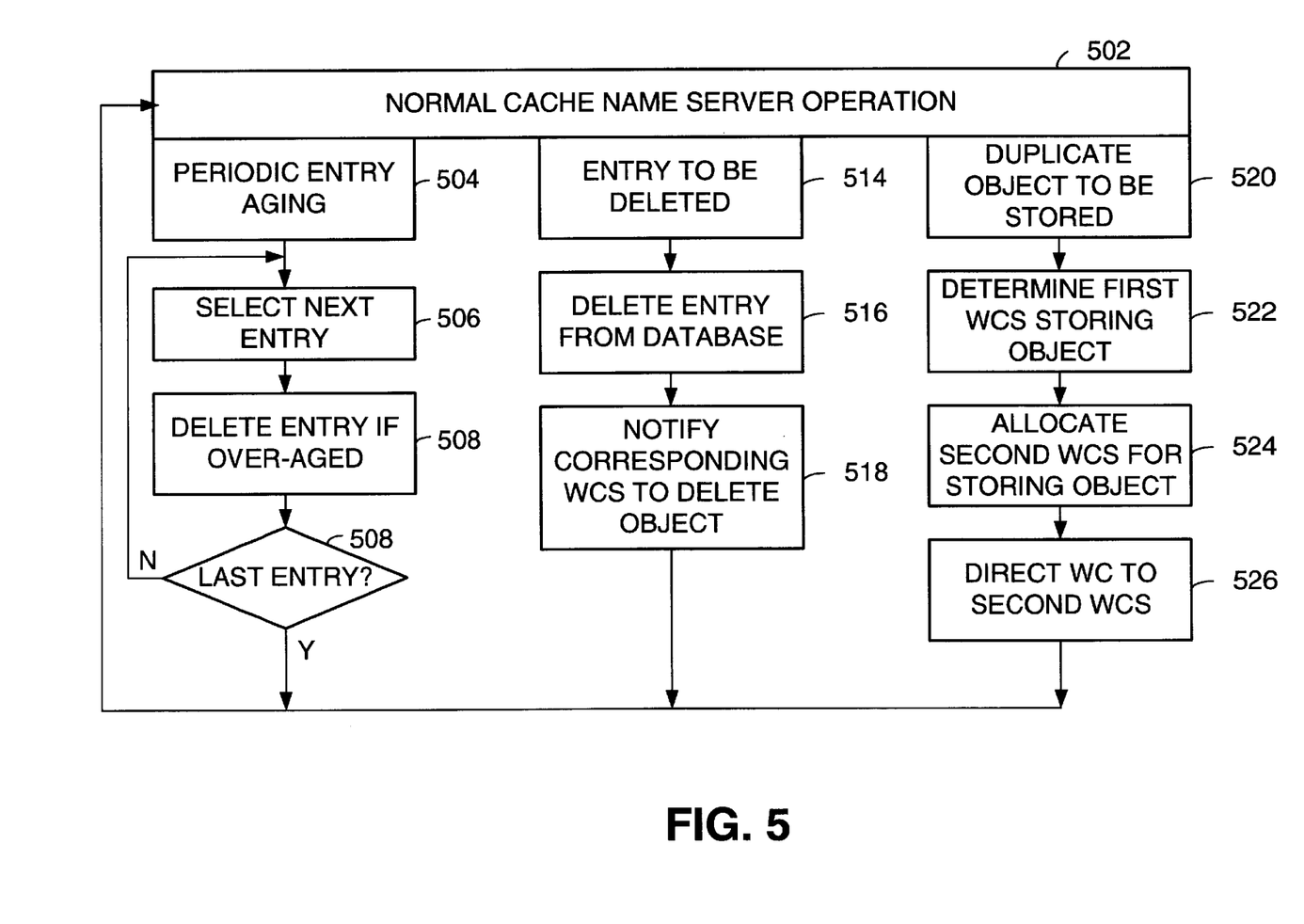
FIG. 5 is a logic diagram illustrating operation of a cache name server according to the present invention in performing several of its operations.

FIG. 5 is a logic diagram illustrating operation of a cache name server according to the present invention in performing several of its operations. These operations are in addition to those previously described with reference to FIGS. 1–4. When not performing any of these particular operations, the CNS continues its normal operations (step 502). This operation continues until such time as the operations described with reference to FIG. 5 are performed.

Periodically, the CNS will perform entry aging (step 504). In such entry aging, the CNS will consider each entry in its database and determine whether it should kept. Thus, in considering each entry separately, the CNS selects an object entry from its database (step 506). The CNS then considers whether the object is over-aged and deletes the object if it is over-aged (step 508). Over-aging criteria may include the actual age of the object, the time since the object was downloaded, the time since any serviced WC accessed the object or such other aging criteria as may be applicable. This operation continues for each object entry until the last entry has been considered (step 508). After all object entries have been considered, operation returns to step 502.

Object entries may be deleted from the CNS during the aging operations (steps 504–508), when the database of the CNS becomes overfilled, or when the database of the CNS is otherwise parsed. When such an object deletion operation is initiated (step 514), the object is first deleted from the CNS database (step 516). Then, the CNS and the caching WCS interact to remove the copy of the object from the previously corresponding WCS (step 518). From step 518, operation returns to step 502.

During some operations of the CNS, the CNS may determine that enough requests are made for a particular object (or for other redundancy reasons) that duplicate copies of the object should be stored (step 520). Upon such a determination, the CNS first determines the identity of the first WCS storing a copy of the object (step 522). The CNS then allocates a second WCS for storing a second copy of the object (step 524). Once the determination is made, the CNS directs the second WCS (via a WC direction) to retrieve and store a copy of the object (step 526). In another operation, the CNS may send a direct request to a WCS to retrieve a copy of the object. Once these operations are complete, normal operations continue (step 502).

Figure 6:
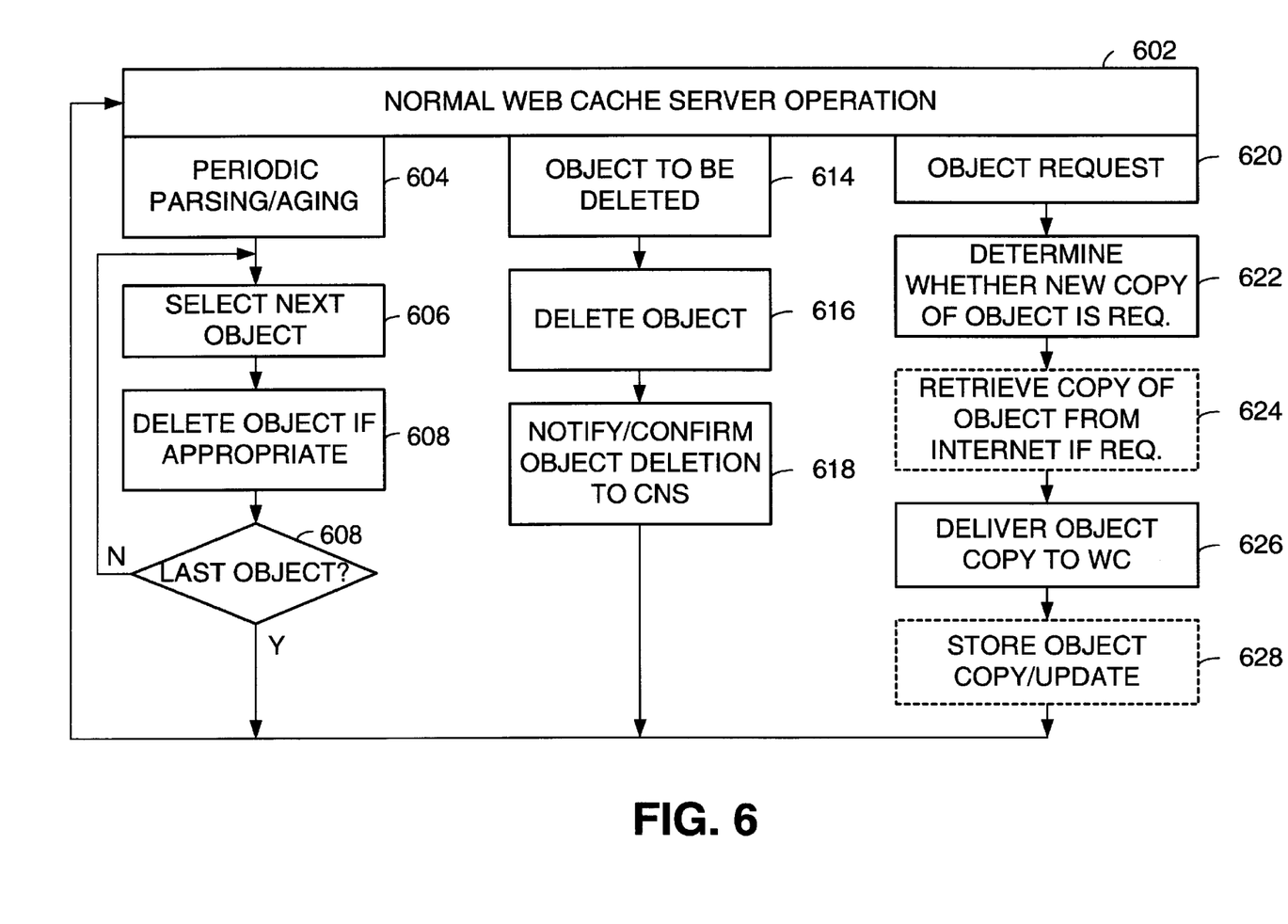
FIG. 6 is a logic diagram illustrating operation of a web cache server according to the present invention in performing several of its operations.

FIG. 6 is a logic diagram illustrating operation of a web cache server according to the present invention in performing several of its various operations. When the illustrated operations are not required of the WCS, the WCS continues its normal operations (step 602). As was previously described, the WCS may perform other functions besides those described herein, such functions including proxy server and firewall functions. The functions described with reference to FIG. 6 include periodic parsing/aging of stored objects, the deletion of stored objects and the servicing of an object request.

Periodically, or when a particular loading level has been reached, the WCS will parse/age the objects it stores (commencing at step 604). In parsing/aging its stored objects, the WCS considers each of the stored objects. Thus, the WCS selects a first/next stored object for consideration (step 606). The WCS then deletes the object if it satisfies deletion criteria. The deletion criteria will typically be the age of the stored object and how the age relates to an age threshold. Alternatively, the deletion criteria may be based upon the frequency at which the stored object is accessed or another criteria. If the currently considered stored object is not the last stored object, the parsing continues. If so, the parsing/aging operations complete and normal WCS operations continue (step 608).

Object deletion operations may be initiated at step 608 or by the CNS (step 614). When a deletion operation is initiated, the object is deleted as are any other entries relating to the object that the CNS stores (step 616). Then, the WCS notifies (or confirms with) the CNS that the object deletion was accomplished (step 616) so that the CNS may update its database to show that the WCS no longer stores the object. Operation then returns to step 602.

When the WCS receives an object request from a WC, the WCS initiates operations that will return a requested object to the WC (step 620). As a first step, the WCS determines whether a new copy of the object is required (step 622). A new copy of the object is required if the WCS does not possess a copy of the object or if the copy of the object is no longer valid due to aging or another criteria. If a new copy of the object is required, the WCS retrieves a copy of the object from the Internet (step 624). The WCS then delivers the object copy to a requesting WC (step 626). Further, if the WCS retrieved a new copy of the object, it stores a copy of the object, updates its internal records and notifies the CNS of the new object copy (step 628). From step 628, operation returns to step 602.

Figure 7:
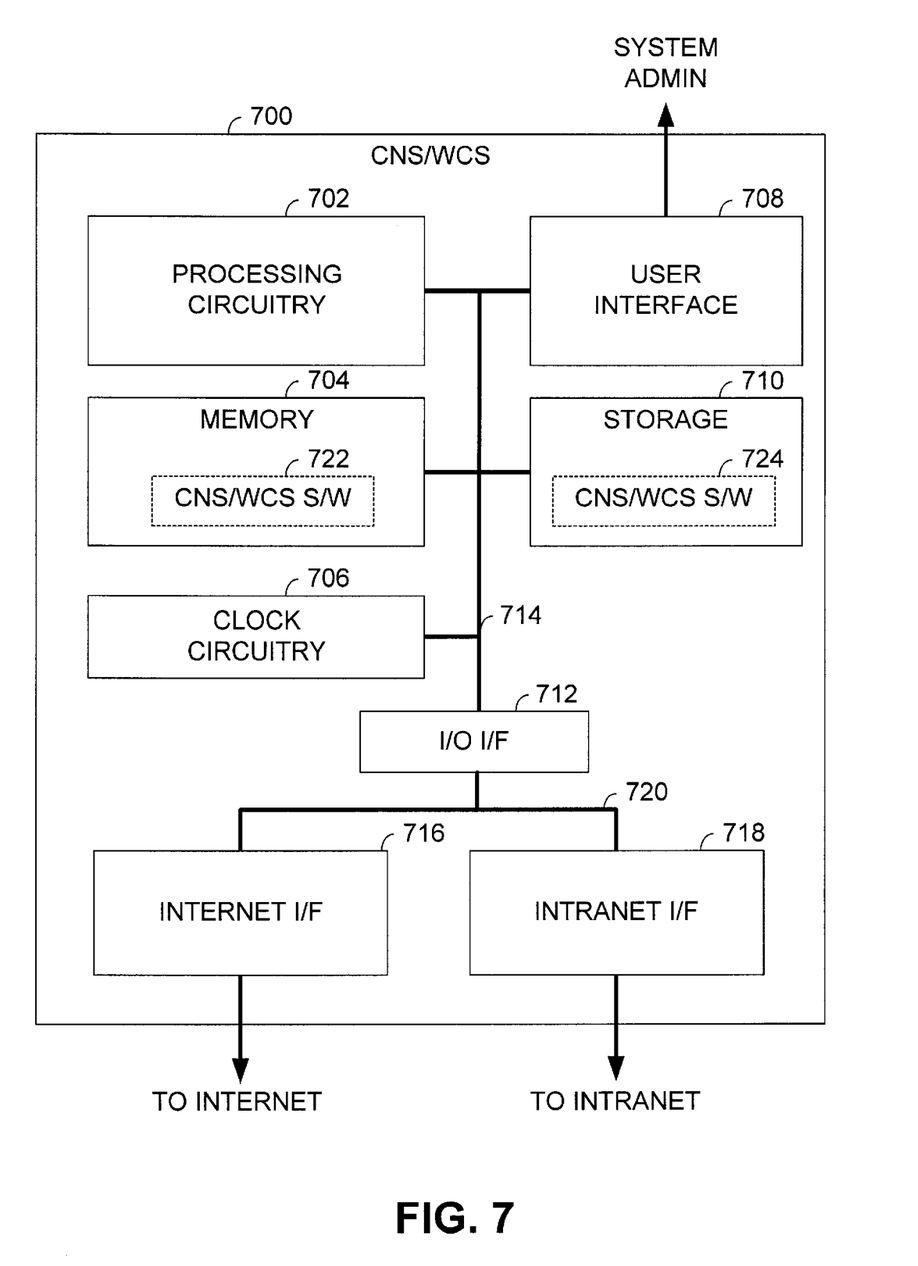
FIG. 7 is a block diagram generally illustrating the structure of a cache name server or a web cache server constructed according to the present invention.

FIG. 7 is a block diagram generally illustrating the structure of a cache name server or a web cache server constructed according to the present invention. The components of a WCS and a CNS are similar in that both include a plurality of digital computer components. The structure of FIG. 7 will be discussed generally and then the differences between the structures of the WCS and the CNS will be described in particular.

The WCS/CNS 700 includes processing circuitry 702, memory 704 (e.g., DRAM, SRAM, EPROM, etc.), clock circuitry 706, a user interface 708 and storage 710 (e.g., hard disk drive, floppy disk drive, CD-ROM, DVD, tape drive, etc.) that intercouple via a processor bus 714. These components are generally known and will be described only as they relate to the present invention. The user interface 708 allows a user to access the various components of the WCS/CNS 700. The WCS/CNS 700 also includes an Intranet interface 718 that couples to the processor bus 714 via a PC bus 720 and an input/output interface 712. The Intranet interface 718 interconnects the WCS/CNS 700 to an Intranet.

The WCS/CNS 700 may also include an Internet interface 716 which couples the WCS/CNS 700 to the Internet. As is appreciated, the Internet Interface 716 is required for a WCS since the WCS accesses the Internet but is optional for the CNS since Internet access is not required for the CNS.

According to the present invention, a CNS includes CNS software instructions 724 that are permanently stored in the storage 710 and that are loaded into memory (CNS software 722) upon their execution. These CNS software instructions 722 and 724 cause the components of the CNS 700 to perform the functions previously described herein with reference to FIGS. 1, 2, 3, 4 and 5.

According to the present invention, a WCS includes WCS software instructions 724 that are permanently stored in the storage 710 and that are loaded into memory (CNS software 722) upon their execution. These WCS software instructions 722 and 724 cause the components of the CNS 700 to perform the functions previously described herein with reference to FIGS. 1 and 6.

Figure 8:
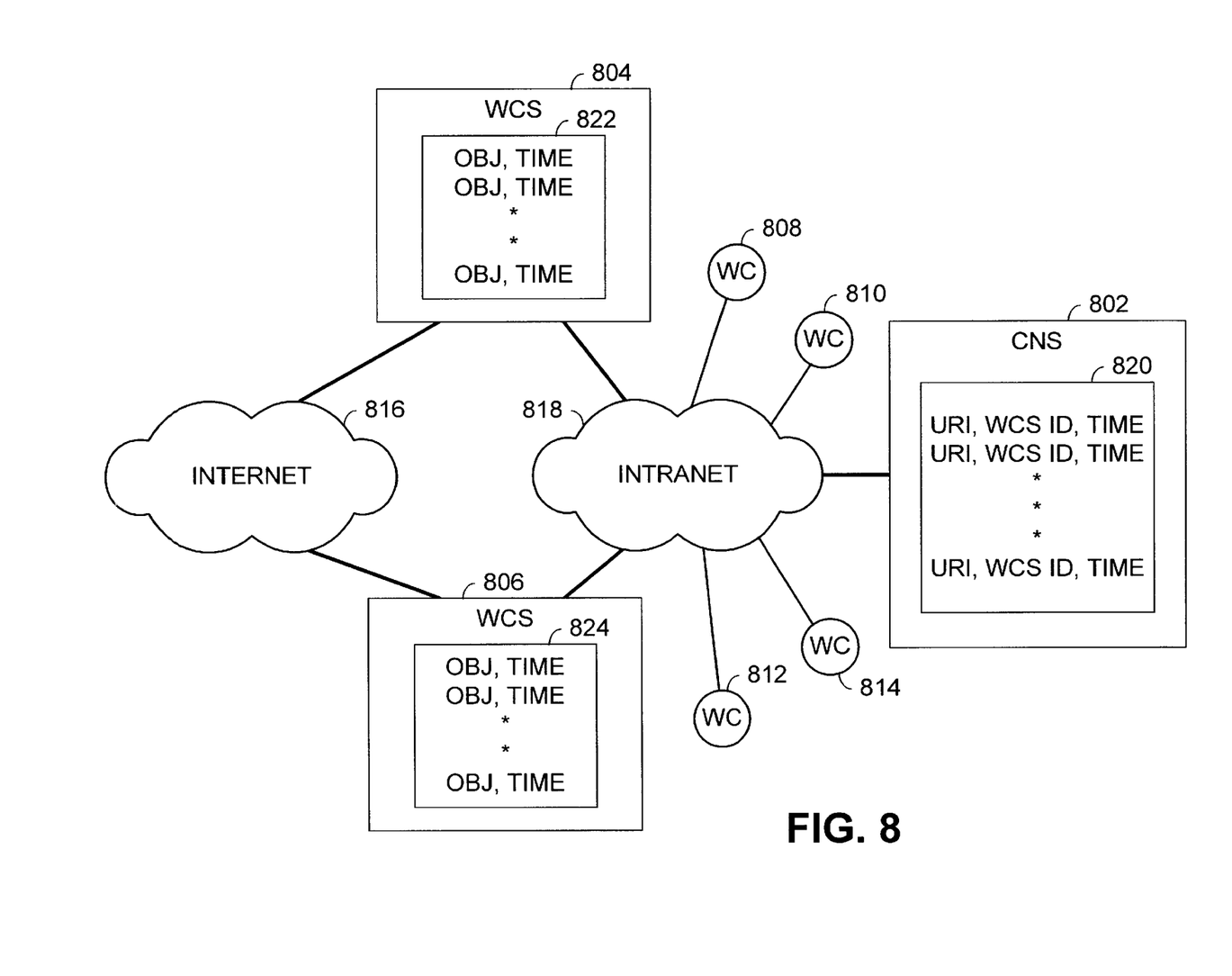
FIG. 8 is a block diagram illustrating an Intranet caching system constructed according to the present invention showing the differing storage location of objects and indexes to the objects.

FIG. 8 is a block diagram illustrating the Intranet caching system constructed according to the present invention showing the differing storage location of objects and indexes to the objects. The Intranet caching system includes a CNS 802 and WCSs 804 and 806 which couple to an Intranet 818. The WCSs 804 also couple to the Internet 816 for object retrieval purposes. A plurality of WCs 808, 810, 812 and 814 also couple to the Intranet.

Each of the WCSs 804 and 806 store objects that have been retrieved from the Internet. As shown, WCS 804 stores objects 822 and the time that the objects were retrieved from the Internet 816. Further, WCS 806 stores objects 824 and the time that the objects were retrieved from the Internet 816. Finally, the CNS 802 stores references to each of the objects stored in the WCS 804 and 806. These references form a database 820 that includes the identity of the object, the WCS that stores the object and the time that the object was downloaded from the Internet 816.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. An object caching system comprising:
   a) a plurality of web cache servers coupled to an internet and to an internet and adapted to store internet objects retrieved from the internet; and
   b) a cache naine server coupled to the internet and adapted to:
   1) receive a request for a desired internet object from a select web client of a plurality of web clients coupled to the internet; and
   2) direct the select web client to request the desired internet object from a serving web cache server selected from the web cache servers;
   in response to a request for the desired internet object from the select web client, the serving web cache server further adapted to:
   1) when the desired internet object is stored on the serving web cache server, provide the desired internet object to the select web client; and
   2) when the desired internet object is not stored on the serving web cache server, retrieve the desired internet object from the internet, store the desired internet object, and provide the desired internet object to the select web client.

2. The system of claim 1 wherein each of the plurality of web clients do not cache internet objects on behalf of other web clients.

3. The system of claim 2 wherein each of the plurality of web clients do not need access to the internet.

4. The system of claim 1 wherein each of the web cache servers, web clients, and cache name server are separate entities.

5. The system of claim 1 wherein the internet objects retrieved from the internet are retrieved from remote servers on the internet.

6. The system of claim 1 wherein when the desired internet object is retrieved from the internet, the serving web cache server is further adapted to report to the cache name server that the desired internet object is stored on the serving web cache server.

7. The system of claim 1 wherein upon receiving the request for the desired internet object, the cache name server is further adapted to:
   a) determine if the desired internet object is stored on one of the web cache servers; and
   b) if the desired internet object is stored on one of the web cache servers, select the one of the web cache servers storing the desired internet object as the serving web cache server.

8. The system of claim 7 wherein upon receiving the request for the desired internet object, the cache name server is further adapted to:
   c) if the desired internet object is not stored on one of the web cache scarves, select one of the web cache servers as the serving web cache server.

9. The system of claim 8 wherein if the desired internet object is not stored on any of the web cache server, the cache name server is further adapted to select one of the web cache servers as the serving web cache server based on loading of each of the web cache servers.

10. The system of claim 1 wherein the desired internet object is stored on a first web cache server and is frequently requested by the web clients, and the cache name server is further adapted to:
    a) recognize that the desired internet object is frequently requested;
    b) direct at least a second web cache server to store the desired internet object; and
    c) upon receiving the request for the desired internet object from the select web client, direct the select web client to request the desired internet object from one of the web cache servers storing the desired internet object.

11. The system of claim 1 wherein when the desired internet object is not stored on any of the web cache servers, the cache name server selects the serving web cache server from the web cache servers based on loading of each of the web cache servers.

12. The system of claim 1 wherein when the desired internet object is not stored on any of the web cache servers, the cache name server selects the sewing web cache server from the web cache servers based on a capability of each of the web cache servers.

13. An object caching system comprising:
    a) a plurality of web cache servers coupled to an internet and to an internet and adapted to store internet objects retrieved from the internet, a first web cache server of the web cache servers having stored a desired internet object, which is frequently requested by a plurality of web clients, which are coupled to the internet; and
    b) a cache name server coupled to an internet and adapted to:
    1) recognize that the desired internet object is frequently requested by ones of the web clients;
    2) direct at least a second web cache server to store the desired internet object;
    3) receive a request for the desired internet object from a select web client of the plurality of web clients; and
    4) direct the select web client to request the desired internet object from a serving web cache server selected from the web cache servers storing the desired internet object in response to the request.

14. The system of claim 13 wherein upon receiving a request for a new internet object that is not stored on any of the web cache servers from the select web client, the cache name server is further adapted to:
    a) select the serving web cache server from the web cache servers based on loading of each of the web cache servers; and
    b) direct the select web client to request the new internet object from the serving web cache server.

15. The system of claim 13 wherein each of the plurality of web clients do not cache internet objects on behalf of other web clients.

16. The system of claim 15 wherein each of the plurality of web clients do not need access to the internet.

17. The system of claim 13 wherein each of the web cache servers, web clients, and cache name server are separate entities.

18. The system of claim 13 wherein the internet objects retrieved from the internet are retrieved from remote servers on the internet.

19. The system of claim 13 wherein in response to a request for the desired internet object from the select web client, the serving web cache server further adapted to provide the desired internet object to the select web client.

* * * * *